US010238242B2

(12) United States Patent
Macleod et al.

(10) Patent No.: US 10,238,242 B2
(45) Date of Patent: Mar. 26, 2019

(54) DISPENSING APPARATUS AND METHOD

(71) Applicants: William Macleod, Worthing (GB); Laura Salinas Manas, Uckfield (GB)

(72) Inventors: William Macleod, Worthing (GB); Laura Salinas Manas, Uckfield (GB)

(73) Assignee: Kennedy Hygiene Products Ltd (GB)

( * ) Notice: Subject to any disclaimer, the term of this patent is extended or adjusted under 35 U.S.C. 154(b) by 46 days.

(21) Appl. No.: 15/353,921

(22) Filed: Nov. 17, 2016

(65) Prior Publication Data
US 2017/0135530 A1 May 18, 2017

(30) Foreign Application Priority Data

Nov. 17, 2015 (GB) .................................. 1520277.3

(51) Int. Cl.
*A47K 5/12* (2006.01)
*G01F 23/26* (2006.01)
*B05B 11/00* (2006.01)

(52) U.S. Cl.
CPC ........ *A47K 5/1211* (2013.01); *B05B 11/0054* (2013.01); *B05B 11/0059* (2013.01); *B05B 11/3009* (2013.01); *G01F 23/263* (2013.01)

(58) Field of Classification Search
CPC .............. A47K 5/1211; B05B 11/0054; B05B 11/0059; B05B 11/3009; G01F 23/263
See application file for complete search history.

(56) References Cited

U.S. PATENT DOCUMENTS

| 3,956,760 A | * | 5/1976 | Edwards | ................. | G01F 23/24 |
| | | | | | 340/620 |
| 4,302,965 A | * | 12/1981 | Johnson | ................. | G01N 11/06 |
| | | | | | 374/142 |
| 4,470,008 A | | 9/1984 | Kato | | |
| 4,472,968 A | * | 9/1984 | Coates | ................. | G01F 23/263 |
| | | | | | 73/304 C |
| 4,487,066 A | * | 12/1984 | Pardi | .................... | G01F 23/263 |
| | | | | | 702/52 |

(Continued)

FOREIGN PATENT DOCUMENTS

| CN | 202304947 | 7/2014 |
| WO | WO 2013/063206 | 5/2013 |
| WO | WO 2015/123364 | 8/2015 |

OTHER PUBLICATIONS

GB Search Report dated May 12, 2016.
International Search Report with Written Opinion (PCT/GB2016/000204) dated Feb. 13, 2017.

*Primary Examiner* — Frederick C Nicolas
*Assistant Examiner* — Randall A Gruby
(74) *Attorney, Agent, or Firm* — King & Partners, PLC

(57) ABSTRACT

The present disclosure relates to a dispenser for dispensing a liquid (LQ). The dispenser has a housing for receiving a removable container containing the liquid (LQ) and dispenses the liquid (LQ) from the container. The dispenser includes a capacitive sensor having a sensing element for positioning proximal to an exterior of the container. A processor is provided for receiving a capacitance signal (SIG1) from the capacitive sensor. The processor is configured to estimate a quantity of liquid (LQ) in the container in dependence on the capacitance signal (SIG1). The present disclosure also relates to a method of estimating a quantity of liquid (LQ) in a container.

17 Claims, 8 Drawing Sheets

(56) References Cited

U.S. PATENT DOCUMENTS

| | | | | |
|---|---|---|---|---|
| 4,512,067 A * | 4/1985 | Kobayashi | G01F 23/263 | 29/25.41 |
| 4,519,012 A * | 5/1985 | Kobayashi | G01F 23/268 | 361/284 |
| 4,562,734 A * | 1/1986 | Kobayashi | G01F 25/0061 | 338/33 |
| 4,594,893 A * | 6/1986 | Lombard | G01F 23/263 | 324/669 |
| 4,674,329 A * | 6/1987 | Mulder | G01F 23/263 | 361/284 |
| 4,749,988 A | 6/1988 | Berman | | |
| 5,051,921 A * | 9/1991 | Paglione | G01F 23/266 | 331/65 |
| 5,602,333 A * | 2/1997 | Larrabee | G01F 23/26 | 324/681 |
| 6,670,817 B2 * | 12/2003 | Fournier | G03G 15/0881 | 324/658 |
| 7,284,427 B2 * | 10/2007 | Calabrese | G01F 23/266 | 73/290 R |
| 9,618,257 B2 * | 4/2017 | Black | F25D 19/00 | |
| 9,810,567 B2 * | 11/2017 | Mears | G01F 23/0069 | |
| 9,877,617 B2 * | 1/2018 | Bullock | A47K 5/1217 | |
| 9,885,360 B2 * | 2/2018 | Boese | F04D 15/0218 | |
| 2005/0217369 A1 | 10/2005 | Holappa et al. | | |
| 2010/0140288 A1 * | 6/2010 | Jones | B01F 15/0244 | 222/1 |
| 2014/0175012 A1 | 6/2014 | Fulkerson et al. | | |
| 2015/0013646 A1 * | 1/2015 | Qi | G01F 23/263 | 123/478 |
| 2015/0313422 A1 * | 11/2015 | Ophardt | H02J 7/0052 | 222/1 |
| 2016/0097668 A1 * | 4/2016 | Vilag | B67D 7/3272 | 222/65 |
| 2016/0114590 A1 * | 4/2016 | Arpin | B41J 2/175 | 347/7 |

\* cited by examiner

DISPENSING APPARATUS AND METHOD

CROSS-REFERENCE TO RELATED APPLICATIONS

This application claims the benefit of GB Patent Application No. 1520277.3 filed Nov. 17, 2015, entitled "DISPENSING APPARATUS AND METHOD" which is hereby incorporated herein by reference in its entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present disclosure relates to a dispensing apparatus and method. More particularly, the present disclosure relates to a dispenser having a sensor for estimating a quantity of liquid in a container; and a method of estimating a quantity of liquid in a container. The present disclosure also relates to an apparatus for estimating a quantity of liquid in a container.

2. Background Art

It is well known to provide a dispenser in a public washroom to dispense soap. The soap is typically stored as a liquid in a container within the dispenser. The container is removably mounted in the dispenser. The washroom is periodically inspected and the dispenser serviced by replacing the container. The quantity of liquid remaining in the container may be estimated indirectly by counting the number of times that the dispenser is actuated. However, this approach relies on an assumption that the dispenser dispenses a uniform amount of the liquid each time it is actuated. In practice, the amount of liquid remaining in the container may differ significantly from the estimation. It would be desirable to measure the amount of liquid directly to provide a more accurate indication of servicing requirements.

It is against this backdrop that the present invention has been conceived. At least in certain embodiments, the present invention seeks to provide a dispenser which overcomes or ameliorates some of the shortcomings associated with the prior art.

SUMMARY OF THE INVENTION

Aspects of the present invention relate to a dispenser; to an apparatus for estimating a quantity of liquid in a container; and to a method of estimating a quantity of liquid in a container.

According to a further aspect of the present invention there is provided a dispenser comprising: (a) a housing for receiving a removable container containing a liquid; (b) dispensing means for dispensing the liquid from the container; (c) a capacitive sensor comprising a sensing element for positioning proximal to an exterior of the container; and (d) a processor for receiving a capacitance signal from the capacitive sensor, the processor being configured to estimate a quantity of liquid in the container in dependence on said capacitance signal. The capacitance signal provides an indication of the capacitance between the sensing element and the liquid contained in the container. A capacitive coupling may be established between the sensing element and the liquid in the container. Changes in the quantity of liquid in the container change the capacitance signal generated by the capacitive sensor. The processor thereby determines the quantity of liquid in the container. The capacitance signal may be generated in dependence on a measured electrical current in the sensing element. The sensing element may be separated from the liquid by a nonconductive (dielectric) layer, for example a wall of the container. The liquid may be electrically conductive.

The capacitive sensor may be provided in the housing and form a component part of the dispenser. At least in certain embodiments, it is not necessary to provide a sensor in the container, allowing the dispenser to be used in conjunction with a conventional container.

The processor may be configured to estimate the quantity of liquid in the container in proportion to the received capacitance signal. The processor may be configured to estimate the quantity of liquid in the container in proportion to the received capacitance signal above a lower signal threshold and/or below an upper signal threshold. An operating range of the capacitive sensor may be defined by a lower signal threshold and/or below an upper signal threshold. At least within said operating range, the quantity of liquid in the container is directly proportional to the received capacitance signal. The processor may be configured to provide an estimate of the quantity of liquid in the container in direct proportion to the received capacitance signal at least within said operating range. The estimate may comprise continuous data (i.e., the estimate may be any numerical value within a range) or may comprise discrete data (i.e., the estimate may be a plurality of discrete numerical values within a range). The processor may define a mathematical function to relate the received capacitance signal to the quantity of liquid in the container. The mathematical function may comprise a linear function or a polynomial function operative to relate the received capacitance signal to the quantity of liquid in the container. The mathematical function may be defined within said operating range of the capacitive sensor.

The lower signal threshold may correspond to a predetermined quantity of liquid in the container. The lower signal threshold may represent a background or base signal when the container is empty. The lower signal threshold may be predefined. The upper signal threshold may correspond to a predetermined quantity of liquid in the container. The upper signal threshold may represent a full container. Alternatively, the upper signal threshold may represent a maximum measurable quantity of liquid in the container. The upper signal threshold may be predefined.

A plurality of capacitance bands may be predefined. The capacitance bands may be defined by a plurality of capacitance thresholds. Each capacitance band may correspond to a predetermined quantity of liquid in the container. The capacitance bands may be stored in a look-up table accessed by the processor. The processor may be configured to identify one of said predefined capacitance bands in dependence on the received capacitance signal. The identified capacitance band may be used to estimate the quantity of liquid in the container. The processor may determine when the quantity of liquid in the container is substantially equal to one of the predetermined quantities of liquid by determining when the received capacitance signal is substantially equal to or falls within one of the plurality of predefined capacitance bands.

The look-up table may be stored in a storage device coupled to the processor. The look-up table may, for example, be stored in system memory disposed in the dispenser. Alternatively, the look-up table may be stored remotely, for example in a base station, and accessed over a communication network.

The sensing element may be adapted to be positioned proximate to a lower portion of the container. The sensing element may be adapted to be positioned proximate to a bottom wall of the container. The sensing element may be adapted to be positioned proximate to an underside of the bottom wall. The capacitive sensor may contact the underside of the bottom wall of the container.

The sensing element may be adapted to contact an exterior of the container. The sensing element may be adapted to contact the container when the container is installed in the housing. The sensing element may be spring biased against the exterior of the container. The sensing element may be adapted to be positioned against an underside of a base of the container. The sensing element may comprise a resilient element to provide said spring bias.

The processor may be configured to output an estimated quantity signal. The estimated quantity signal may comprise an estimated volume of the liquid in the container. Alternatively, or in addition, the estimated quantity signal may comprise a ratio or a percentage expressing the estimated quantity of liquid in the container as a proportion of the liquid held in the container when full. The processor may be coupled to a transmitter for transmitting the estimated quantity signal. The estimated quantity signal may be transmitted to a base station. The transmitter may, for example, be a radio frequency (RF) transmitter.

A support member may be provided for supporting the container. The support member may be fixedly mounted in the housing to provide a fixed platform for supporting the container. The container may be at least partially supported by said support member. The dispenser may be configured such that, in use, the position of the container in in the housing is fixed. The sensing element may be associated with said support member for positioning proximal to the container. The sensing element could be incorporated into said support member, for example moulded into the support member. Alternatively, the sensing element may be disposed in an aperture or recess formed in the support member, for example in an upper surface of the support member. Alternatively, the sensing element may be disposed above the support member. For example, the sensing element may be disposed above an upper surface of the support member. When the container is installed, the sensing element may be configured to locate between said support member and the container.

The dispenser described herein may be configured for dispensing a washing agent, such as a soap, from the container. The soap may be stored in the container in a liquid form.

According to a further aspect of the present invention there is provided a dispenser comprising: (a) a housing for receiving a removable container containing a liquid; (b) dispensing means for dispensing the liquid from the container; (c) a capacitive sensor comprising a sensing element for positioning proximal to an exterior of the container; and (d) a transmitter for transmitting a capacitance signal generated by the capacitive sensor to a remote processor. The sensing element may be disposed proximal to a base of the container, for example proximal to an underside of a bottom wall of the container. The sensing element may contact the underside of the bottom wall of the container.

The transmitter may be a wired transmitter or a wireless transmitter, for example a radio frequency (RF) transmitter. The capacitance signal may be transmitted over a communications network, such as a local area network (LAN), a wide area network (WAN) or the internet, to be processed remotely. The processor may, for example, be provided in a base station. The base station may, for example, comprise one or more server. The base station may be coupled to a plurality of said processors and configured to schedule servicing or maintenance in dependence on the estimated quantities of liquid.

According to a further aspect of the present invention there is provided an apparatus for estimating a quantity of liquid in a container, the apparatus comprising: (a) a capacitive sensor comprising a sensing element for positioning proximal to an exterior of the container; and (b) a processor for receiving a capacitance signal from the capacitive sensor, the processor being configured to estimate a quantity of liquid in the container in dependence on said capacitance signal. The processor may be configured to estimate the quantity of liquid in the container in proportion to the received capacitance signal.

A plurality of capacitance bands may be predefined, each capacitance band corresponding to a predetermined quantity of liquid in the container. The processor may be configured to identify one of said predefined capacitance bands in dependence on the received capacitance signal.

The sensing element may be adapted to be positioned proximate to a lower portion of the container. The sensing element may be adapted to be positioned proximate to a bottom wall of the container. The sensing element may be adapted to be positioned proximate to an underside of the bottom wall. The sensing element may contact the underside of the bottom wall of the container.

According to a still further aspect of the present invention there is provided a dispenser comprising apparatus as described herein.

According to a yet further aspect of the present invention there is provided a method of estimating a quantity of liquid in a container, the method comprising: using a capacitive sensor to generate a capacitance signal and estimating a quantity of liquid in the container in dependence on said capacitance signal, wherein the quantity of liquid in the container is estimated in proportion to the received capacitance signal. The capacitance signal provides an indication of the capacitance between the sensing element and the liquid contained in the container. A capacitive coupling may be established between the sensing element and the liquid in the container. Changes in the quantity of liquid in the container change the capacitance signal generated by the capacitive sensor. The capacitance signal may be generated in dependence on a measured electrical current in the capacitive sensor. The quantity of liquid in the container may be directly proportional to the received capacitance signal.

The quantity of liquid in the container may be estimated with reference to a plurality of predefined capacitance bands, each capacitance band corresponding to a predetermined quantity of liquid in the container. The method may comprise identifying one of said predefined capacitance bands in dependence on the received capacitance signal.

The sensing element may be disposed proximal to an exterior of the container. In certain embodiments, the sensing element may be disposed proximal to a base of the container. The container may be provided in a dispenser in which the capacitive sensor is installed.

The method may comprise estimating the quantity of liquid in the container in direct proportion to the received capacitance signal at least within said operating range. The estimate may comprise continuous data (i.e., the estimate may be any numerical value within a range) or may comprise discrete data (i.e., the estimate may be a plurality of discrete numerical values within a range). The method may comprise applying a mathematical function which relates the received capacitance signal to the quantity of liquid in the container. The mathematical function may comprise a linear function or a polynomial function. The application of the mathematical function may enable the quantity of liquid in the container to be estimated in dependence on the received capacitance signal. The mathematical function may be defined within an operating range of the capacitive sensor.

A processor may be provided to estimate the quantity of liquid in the container. The processor may be provided locally, for example in the dispenser. Alternatively, the processor may be provided remotely. The capacitance signal may be transmitted over a communications network, such as a local area network (LAN), a wide area network (WAN) or the internet, to be processed remotely. The processor may, for example, be provided in a base station. The base station may, for example, comprise one or more server. The base station may be coupled to a plurality of said processors and configured to schedule servicing or maintenance in dependence on the estimated quantities of liquid.

It will be understood that the term liquid used herein also covers gels and creams.

The processor may be configured to execute a set of computational instructions stored in a non-transitory computer-readable media. The computational instructions may be read from said non-transitory computer-readable media into system memory for execution by the processor.

Any control unit described herein may suitably comprise a computational device having one or more electronic processors. The system may comprise a single control unit or alternatively different functions of the control unit may be embodied in, or hosted in, different control units. As used herein the term "control unit" will be understood to include both a single control unit and a plurality of control units collectively operating to provide any stated control functionality. To configure a control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said control unit to be executed on said computational device. The control unit may be implemented in software run on one or more processors. One or more other control unit may be implemented in software run on one or more processors, optionally the same one or more processors as the first control unit. Other suitable arrangements may also be used.

As used herein the term "processor" will be understood to include both a single processor and a plurality of processors collectively operating to provide any stated control functionality. To configure a processor, a suitable set of instructions may be provided which, when executed, cause said processor to implement the control techniques specified herein. The set of instructions may suitably be embedded in said one or more processors. Alternatively, the set of instructions may be provided as software saved on one or more memory associated with said processor to be executed on said processor. The instructions may be provided on a non-transitory computer readable media.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION OF THE INVENTION

A dispenser 1 for dispensing a liquid LQ in accordance with an embodiment of the present invention will now be described with reference to the accompanying figures. In the present embodiment the dispenser 1 is suitable for use in a washroom and the liquid LQ to be dispensed is a liquid soap.

Figure 1:
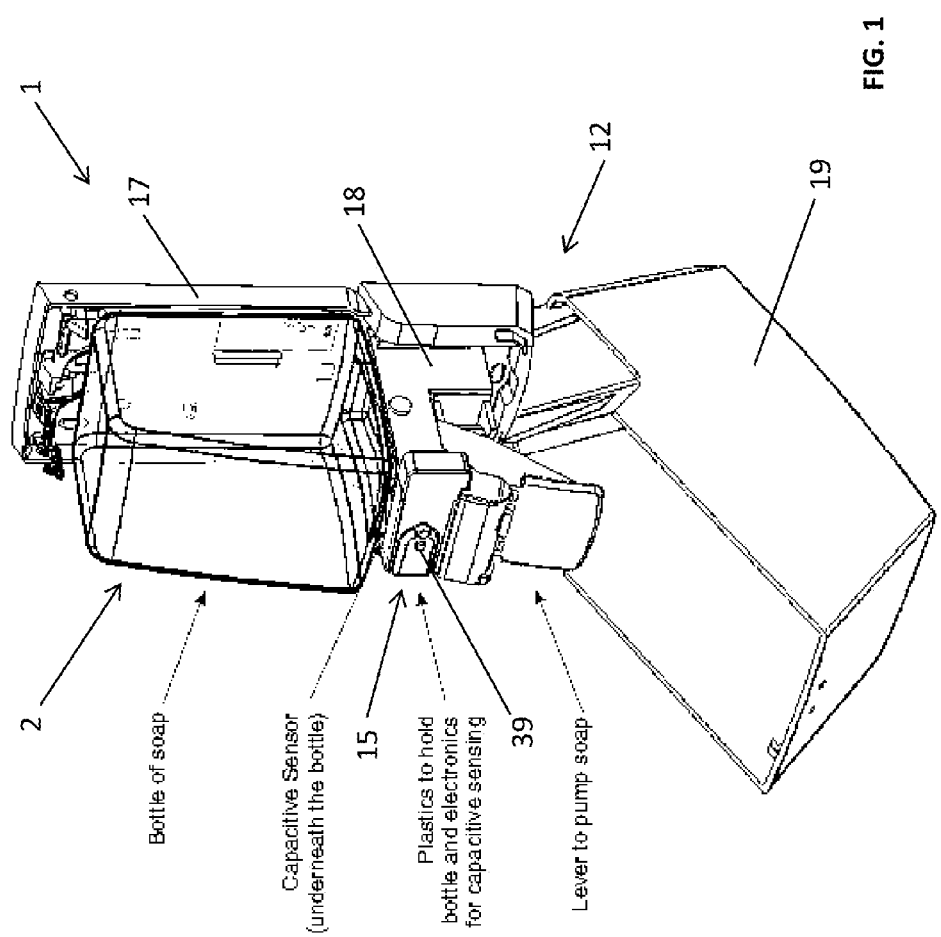
FIG. 1 shows a perspective view of a dispenser in accordance with an embodiment of the present invention.
Figure 2:
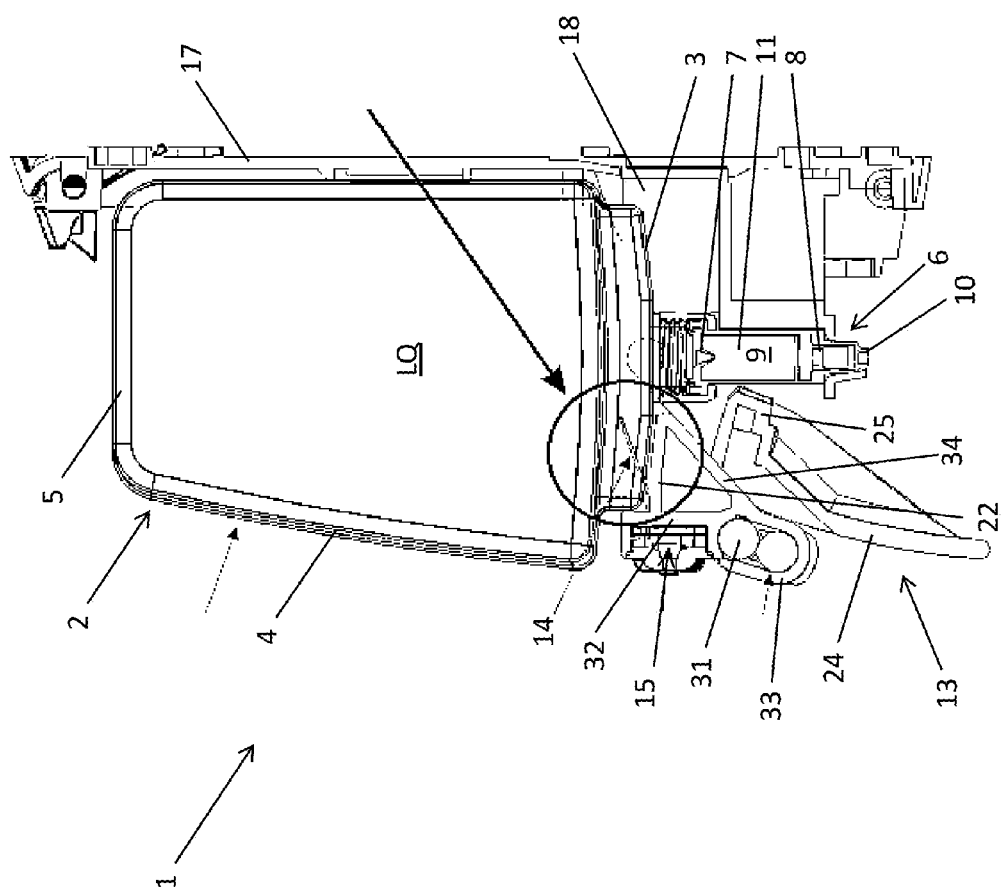
FIG. 2 shows a sectional view through the dispenser shown in FIG. 1.

A perspective view of the dispenser 1 with a container 2 containing the liquid LQ is shown in FIG. 1. The container 2 can be removed from the dispenser 1 and replaced when the liquid LQ is depleted. The container 2 is of conventional design and comprises a one-piece body moulded from a plastics material. In the present embodiment the container 2 has an internal volume of approximately 650 ml for containing the liquid LQ. As shown in FIG. 2, the container 2 comprises a bottom wall 3, a sidewall 4 and a top wall 5. The bottom wall 3 is disposed at the bottom of the container 2 and extends substantially horizontally. The sidewall 4 in the present embodiment is deformable, but alternate embodiments may incorporate a rigid sidewall. A valve assembly 6 is mounted to the bottom wall 3 and is adapted to dispense a metered volume of the liquid LQ when the dispenser 1 is operated. In the present embodiment the bottom wall 3 has a concave profile and the valve assembly 6 is mounted at the lowermost extent of the bottom wall 3 to promote the flow of the liquid LQ into the valve assembly 6. The valve assembly 6 comprises an upper valve 7 and a lower valve 8 disposed at opposing ends of a deformable pumping chamber 9. A dispensing nozzle 10 is provided at the bottom of the valve assembly 6. The upper and lower valves 7, 8 are one-way valves arranged in series to allow the liquid LQ to be dispensed from the container 2. The upper valve 7 inhibits the return of the liquid LQ from the tubular member 11 into the container 2. The pumping chamber 9 in the present embodiment is formed by a resilient tubular member 11. In use, an actuating force is applied to deform the tubular member 11, thereby reducing its internal volume and expelling liquid LQ through the lower valve 8. When the actuating force is removed, the tubular member 11 returns to its un-deformed state and liquid LQ is drawn into the pumping chamber 9 through the upper valve 7.

Figure 3:
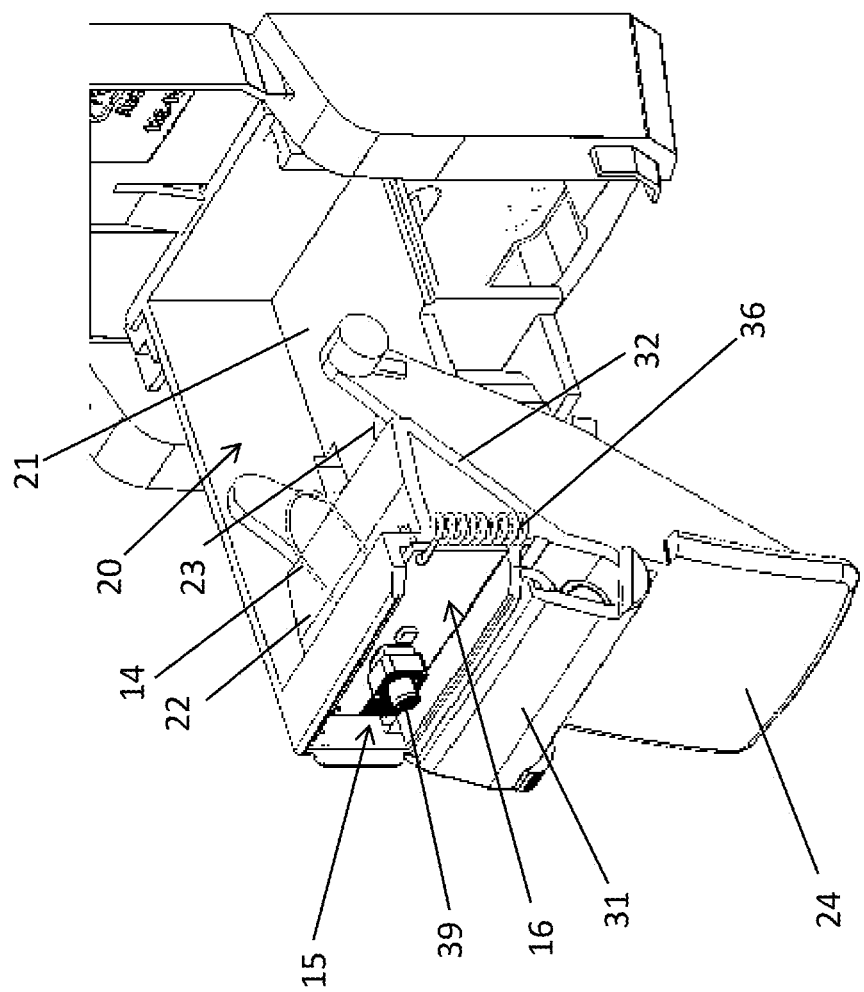
FIG. 3 shows a perspective view of the dispenser with the container removed.

With reference to FIGS. 1 and 2, the dispenser 1 comprises a housing 12, a dispensing actuator 13, a capacitive sensor 14, an electronic control unit 15 and a transmitter 16. The housing 12 comprises a mounting plate 17, a support frame 18 and a pivotally mounted cover 19. The mounting plate 17 is adapted to be mounted to a wall to mount the dispenser 1. The support frame 18 projects outwardly from the mounting plate 17 and is adapted to support the container 2. As shown in FIG. 3, the support frame 18 comprises a cup-shaped member 20 for receiving the bottom wall 3 of the container 2. The cup-shaped member 20 has a base panel 21 which extends substantially horizontally. A support member 22 is disposed at the front of the cup-shaped member 20 for locating the container 2 within the housing 12. The support member 22 is profiled to match the profile of the underside of the bottom wall 3. The support member 22 also locates the capacitive sensor 14 against the underside of bottom wall 3. The valve assembly 6 extends through an aperture 23 formed in the base panel 21. The cover 19 is pivotally mounted to a lower portion of the mounting plate 17 and, in use, is movable between an open position (as shown in FIG. 1) and a closed position (not shown). The cover 19 is pivoted to said open position for servicing, for example to replace the container 2; and pivoted to said closed position for use.

As shown in FIGS. 2 and 3, the dispensing actuator 13 comprises a lever 24 pivotally mounted to the support frame 18. The lever 24 comprises an actuating arm 25 (shown in FIG. 2) arranged to cooperate with the valve assembly 6 to dispense the liquid LQ. When the lever 24 is actuated, the actuating arm 25 applies an actuating force to the tubular member 11. The tubular member 11 is deformed and the liquid LQ is dispensed through the lower valve 8. A return spring (not shown) is provided to return the lever 24 to a standby position, as shown in FIG. 1. The dispensing actuator 13 provides dispensing means for dispensing the liquid LQ from the container 2. The dispensing actuator 13 in the present embodiment is a manually operated mechanism, but in alternative embodiments the dispensing actuator 13 could be automated, for example by an electric drive motor or a solenoid.

Figure 4:
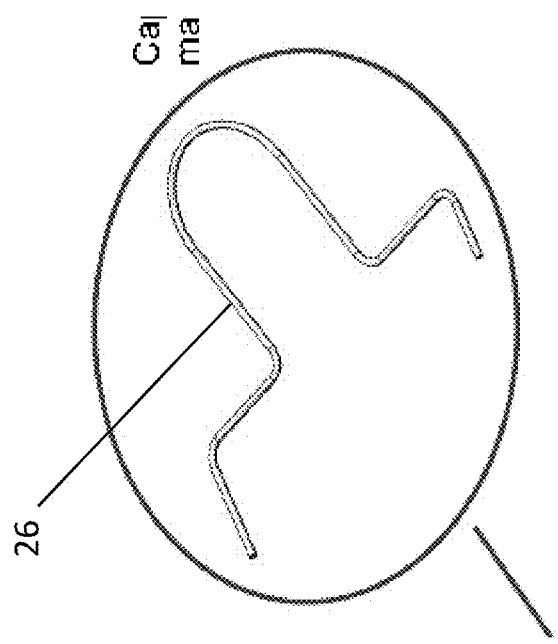
FIG. 4 shows an enlarged perspective view of a sensing element of the capacitive sensor.
Figure 6:
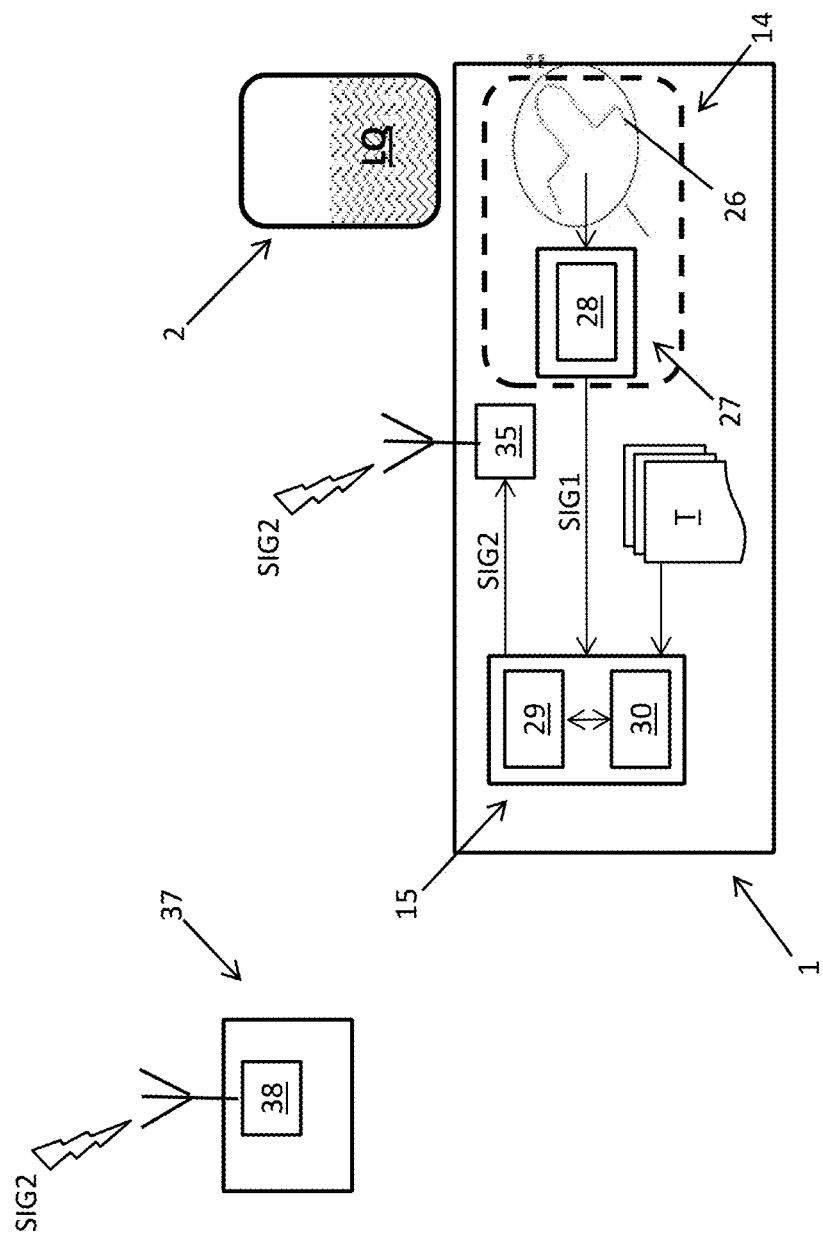
FIG. 6 shows a schematic representation of the electronic control unit and capacitive sensor in accordance with an aspect of the present invention.

The capacitive sensor 14 comprises a sensing element 26 and a sensor control unit 27. The sensing element 26 is adapted to be positioned proximal to the bottom wall 3 of the container 2. In the present embodiment, the sensing element 26 is configured to locate against an underside of the bottom wall 3. The sensing element 26 is formed from an electrically conductive material. As shown in FIG. 4, the sensing element 26 comprises a length of metal wire formed into a U-shaped loop. The sensing element 26 is inclined upwardly so as to engage the bottom wall 3 when the container 2 is installed in the housing 12. The sensing element 26 is a resilient member which is spring-biased against the underside of the bottom wall 3 to establish a physical contact with the container 2. The sensing element 26 is deflected when the container 2 is installed and held in position between the underside of the bottom wall 3 and the support member 22. The sensing element 26 extends towards the lowermost portion of the container 2 where the valve assembly 6 is mounted to the bottom wall 3. This arrangement helps to ensure that the positioning of the sensing element 26 and the container 2 relative to each other remains at least substantially unchanged each time the container 2 is replaced. As illustrated in FIG. 6, the sensor control unit 27 comprises a first processor 28. The first processor 28 comprises an operational amplifier and an analogue-to-digital (ADC) converter.

Figure 5:
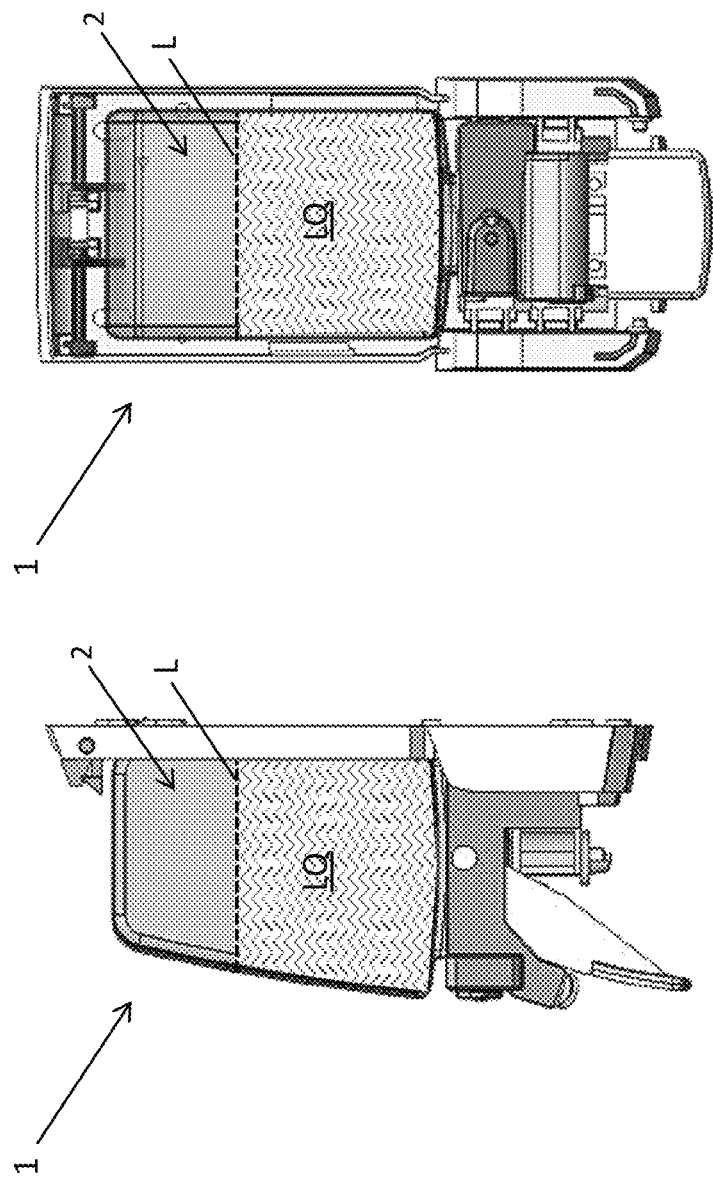
FIG. 5A shows a front elevation of the dispenser with the cover omitted.
FIG. 5B shows a side elevation of the dispenser with the cover omitted.

The liquid LQ is electrically conductive and forms a target object for the capacitive sensor 14. The bottom wall 3 of the container 2 is formed from a nonconductive (dielectric) material which forms a gap between the capacitive sensor 14 and the liquid LQ. The distance between the capacitive sensor 14 and the liquid LQ in the bottom of the container 2 is constant. However, changes in the quantity of the liquid LQ in the container 2 alter the effective size of the target object which results in a change in capacitance between the capacitive sensor 14 and the liquid LQ. As described herein, the capacitive sensor 14 is configured to detect changes in the capacitance and, thereby, to estimate the quantity of liquid LQ in the container 2. The inventor(s) in the present case have determined that in certain embodiments the changes in the capacitance are at least partially dependent on a level L of the liquid LQ in the container 2. Thus, measuring the capacitance between the capacitive sensor 14 and the liquid LQ may provide an indication of the level L of the liquid LQ in the container 2. The level L of the liquid LQ in the container 2 is illustrated in the front and side elevations of the dispenser 1 shown in FIGS. 5A and 5B.

In use, an alternating voltage is supplied to the sensing element 26 to establish an electrical field. The electrical current in the sensing element 26 varies in dependence on the capacitance between the capacitive sensor 14 and the liquid LQ. The electrical current in the sensing element 26 can be measured to provide an indication of the capacitance. The electrical current measured by the sensing element 26 is supplied to the operational amplifier of the first processor 28. The amplified signal is converted by the analogue-to-digital converter to a digital signal, for example comprising a binary or hexadecimal value. The digital signal represents a capacitance signal SIG1 which is output by the first processor 28. The capacitance signal SIG1 is output from the capacitive sensor 14 to the electronic control unit 15. The capacitance signal SIG1 is generated in dependence on the electrical current in the sensing element 26 and provides an indication of the capacitance between the capacitive sensor 14 and the liquid LQ in the container 2.

With reference to FIG. 6, the electronic control unit 15 comprises a second processor 29 coupled to system memory 30 and powered by two batteries 31. The electronic control unit 15 is mounted to a front face 32 of the cup-shaped member 20 and the batteries 31 are housed in a sleeve 33 beneath the electronic control unit 15. The batteries 31 are disposed remote from the capacitive sensor 14 to reduce interference. A brace 34 is provided to support the support member 22 and the sleeve 33. The brace 34 also forms a stop for limiting forward travel of the lever 24.

A set of computational instructions is stored on the system memory 30. When executed, the computational instructions cause the second processor 29 to estimate the quantity of the liquid LQ in the container 2 in dependence on the received capacitance signal SIG1. The capacitance signal SIG1 changes in proportion to changes in the quantity of the liquid LQ in the container 2. The second processor 29 cross-references the capacitance signal SIG1 with a look-up table T stored in the system memory 30. The look-up table T defines a lower signal threshold and an upper signal threshold. The lower signal threshold corresponds to a base capacitance measurement, for example corresponding to a minimum quantity of liquid LQ in the container 2 or when the container 2 is empty. The upper signal threshold corresponds to a maximum quantity of liquid LQ in the container 2, for example when the container 2 is full of liquid LQ. In the present embodiment the upper signal threshold corresponds to approximately 600 ml of liquid LQ in the container 2. The upper and lower signal thresholds can be predefined, for example by the manufacturer of the dispenser 1. Alternatively, or in addition, the upper and lower signal thresholds can be determined dynamically, for example by calibrating the dispenser 1 when a container 2 full of the liquid LQ is installed.

At least between said upper and lower signal thresholds, the quantity of liquid LQ in the container 2 is proportional to the capacitance signal SIG1 received from the capacitive sensor 14. The second processor 29 may, for example, be configured to continuously estimate the quantity of liquid LQ in direct proportion to the signal from the capacitive sensor 14. Alternatively, the look-up table T may define a plurality of capacitance bands, each capacitance band corresponding to a sub-division of the total quantity of the liquid LQ in the container 2. The look-up table T could, for example, define twelve (12) capacitance bands each corresponding to approximately 50 ml of the liquid LQ. It will be understood that the look-up table T may define less than or more than twelve (12) capacitance bands. Moreover, the capacitance bands may each correspond to a different quantity of liquid LQ. For example, each capacitance band may correspond to 10 ml, 25 ml, 75 ml or 100 ml of liquid LQ. The capacitance bands are defined between the upper and lower signal thresholds. The second processor 29 receives the capacitance signal SIG1 and identifies the applicable capacitance band and outputs a corresponding quantity estimation signal SIG2 indicating the estimated quantity of liquid LQ in the container 2.

In the present embodiment, the electronic control unit 15 is connected to a transmitter 35. The transmitter 35 is a radio frequency transmitter having a so-called "pigtail" antenna 36. The transmitter 35 is configured to transmit the quantity estimation signal SIG2 to a base station 37 having a receiver 38, as shown schematically in FIG. 6. The base station 37 is operative to monitor the quantity of the liquid LQ in the container 2. The electronic control unit 15 comprises a synchronization button 39 (shown in FIG. 3) operable to synchronise the dispenser 1 with the base station 37. A unique identifier code may be defined in the system memory 30 to allow the base station to identify the dispenser 1 and to monitor the quantity of liquid LQ in the container 2. The synchronization button 39 is intended for use by a service attendant, for example when the dispenser 1 is first installed, and is covered when the cover 19 is in its closed position.

The operation of the dispenser 1 will now be described with reference to the accompanying figures. The dispenser 1 is typically installed in a public washroom and is serviced periodically by a service attendant. The cover 19 of the dispenser 1 is opened and a full container 2 installed. The valve assembly 6 projects through the aperture 23 such that the dispensing nozzle 10 projects from the bottom of the housing 12 for dispensing liquid LQ. The bottom of the container 2 locates in the cup-shaped member 20 and is supported by the support member 22. The bottom wall 3 of the container 2 engages the sensing element 26. As the container 2 is introduced into the housing 12, the sensing element 26 is deflected downwardly and is retained in position between the bottom wall 3 and the support member 22. If required, the synchronization button 39 is depressed to synchronize the electronic control unit 15 with the base station. The cover 19 is then closed to secure the container 2 inside the dispenser 1.

The liquid LQ in the container 2 passes through the upper valve 7 and into the pumping chamber 9. The lever 24 is actuated by a user to cause the actuating arm 25 to apply an actuating force to deform the resilient tubular member. A metered volume of the liquid LQ is dispensed from the pumping chamber 9 through the dispensing nozzle 10. The lever 24 is released and returns to its standby position. An alternating voltage is supplied to the capacitive sensor 14 by the electronic control unit 15. By measuring the current in the sensing element 26, an indication of the capacitance between the capacitive sensor 14 and the remaining liquid LQ in the container 2 can be determined. The capacitive sensor 14 outputs a capacitance signal SIG1 to the electronic control unit 15. The electronic control unit 15 accesses a look-up table to estimate the quantity of liquid LQ remaining in the container in dependence on the capacitance signal SIG1. The electronic control unit 15 outputs the quantity estimation signal SIG2 to the transmitter 35 for wireless transmission to the base station 37. The base station 37 can thereby remotely monitor the quantity of liquid LQ remaining in the container 2 and schedule servicing when there is a predetermined percentage remaining. For example, the base station 37 may schedule servicing when there is 10% of the liquid LQ remaining in the container 2. The base station 37 may be located on-site or at a separate location. The base station 37 may communicate with the dispenser 1 over a network, such as the internet.

The liquid LQ dispensed from the dispenser 1 in the present embodiment is a liquid soap. The soap is stored in the container 2 in the form of a liquid. The liquid may foam as it is dispensed. For example, the liquid may be aerated as it is dispensed, or it may comprise a foaming agent. The liquid soap may be a gel or a cream.

The dispenser 1 may optionally comprise a display unit to provide a visual indication of the amount of liquid LQ remaining. The display unit may comprise a liquid crystal display (LCD) configured to display the percentage of the liquid LQ remaining in the container 2.

Figure 7:
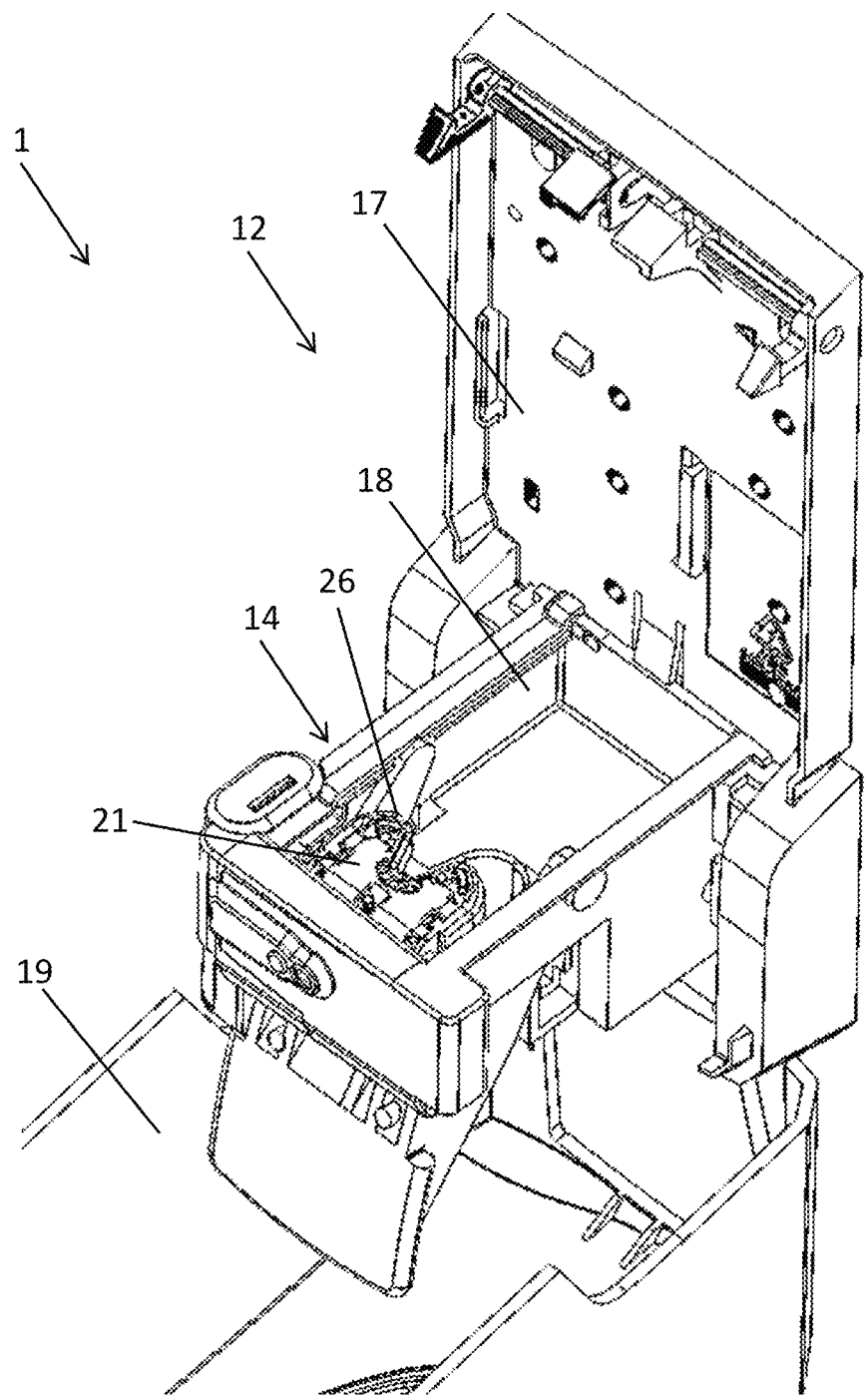
FIG. 7 shows a perspective view of a dispenser in accordance with a further embodiment of the present invention with the cover in an open position.
Figure 8:
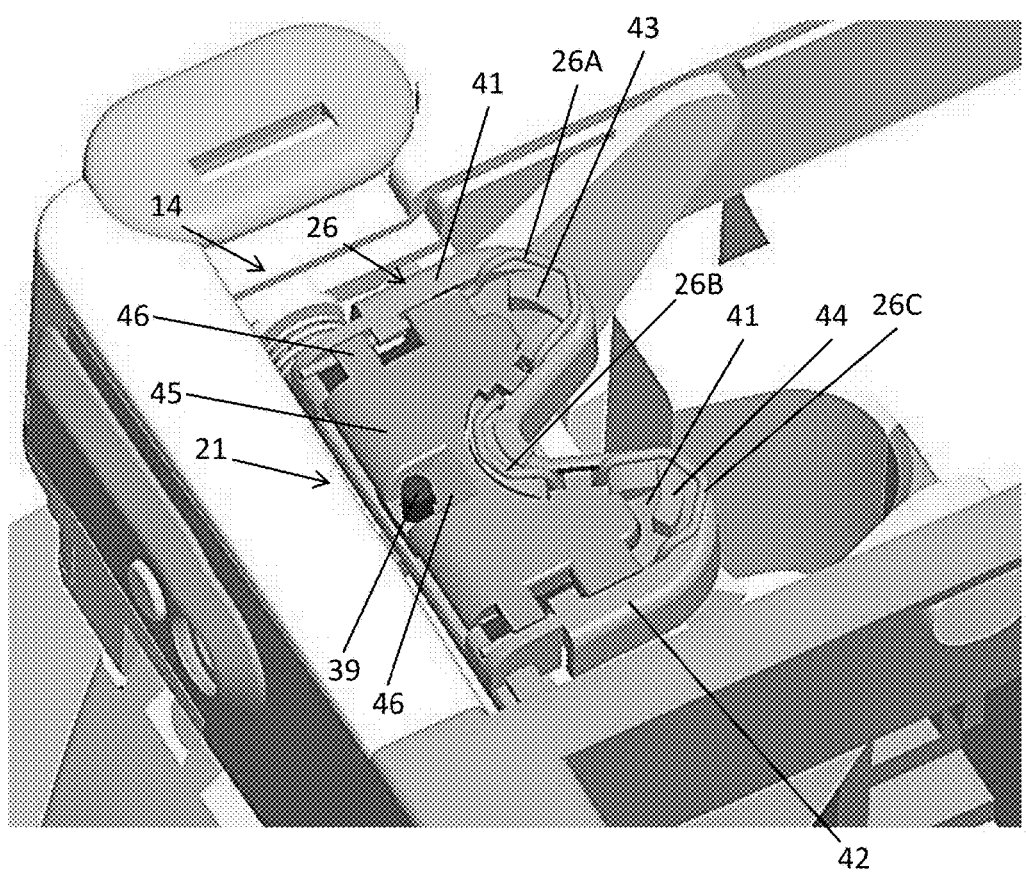
FIG. 8 shows an enlarged perspective view of a sensing element of the capacitive sensor in the embodiment shown in FIG. 7.

A dispenser 1 in accordance with a further embodiment of the present invention is shown in FIGS. 7 and 8. The dispenser 1 is a variant of the previous embodiment and like reference numerals are used for like components. The capacitive sensor 14 and the support member 22 are modified in this embodiment and the description herein details these modifications.

The dispenser 1 comprises a housing 12, a dispensing actuator 13 and a capacitive sensor 14. The housing 12 comprises a mounting plate 17, a support frame 18 and a pivotally mounted cover 19. The mounting plate 17 is adapted to be mounted to a wall to mount the dispenser 1. The support frame 18 projects outwardly from the mounting plate 17 and is adapted to support the container 2. The container 2 (not shown in FIGS. 7 and 8) has the same configuration as the arrangement illustrated in FIGS. 1 to 6. In particular, the container 2 is a one-piece body comprising a bottom wall 3, a sidewall 4 and a top wall 5. The container 2 is moulded from a plastics material and contains a liquid LQ. The liquid LQ is a liquid soap and the container 2 can be removed and replaced to service the dispenser 1.

The capacitive sensor 14 comprises a sensing element 26 coupled to an electronic control unit 15 (not shown in FIGS. 7 and 8). The sensing element 26 is adapted to locate against an underside of the bottom wall 3 of the container 2. As shown in FIG. 8, the sensing element 26 is formed from an electrically conductive element, such as a metal wire, comprising first, second and third curved sections 26A-C arranged in a generally W-shaped configuration. The sensing element 26 is adapted to engage an underside of the bottom wall 3 to establish direct physical contact with the container 2. The sensing element 26 is disposed between the underside of the bottom wall 3 and the support member 22. The bottom wall 3 of the container 2 is non-conductive (i.e., dielectric) and forms an electrical insulator between the sensing element 26 and the liquid LQ which are electrically conductive.

The support member 22 is arranged to support the container 2 in the dispenser 1. The support member 22 is fixedly mounted in the housing 12 and forms a fixed platform for the container 2. In the present embodiment, the support member 22 comprises a central region 40, a first lateral sidewall 41, a second lateral sidewall 42, a first protrusion 43 and a second protrusion 44. The lateral sidewalls 41, 42 and the protrusions 43, 44 are arranged to engage the lower surface of the bottom wall 3 to support the container 2. The first, second and third curved sections 26A-C of the sensing element 26 project upwardly above the protrusions 43, 44 to contact the underside of the container 2. The central region 40 forms a recess in which the sensing element 26 is mounted. A mounting plate 45 is fastened to the top of the support member 22. The mounting plate 45 comprises laterally extending mounting lugs 46 for fixedly mounting the sensing element 26 to the support member 22. The sensor mounting member 45 also comprises a slot 46 in which the synchronization button 39 is disposed.

A capacitive coupling is established between the sensing element 26 and the liquid LQ in the container 2. The capacitive sensor 14 is operative to measure the capacitance between the sensing element and the liquid LQ in the container 2. In use, an electrical current is supplied to the sensing element 26. The electrical current in the sensing element 26 is affected by the quantity of liquid LQ in the container 2. The electrical current in the sensing element 26 is measured to provide an indication of the capacitance. In particular, the electrical current in the sensing element 26 is output to the operational amplifier of the first processor 28. The amplified signal is converted by the analogue-to-digital converter to a digital signal which represents the capacitance signal SIG1. The capacitance signal SIG1 provides an indication of the capacitance between the capacitive sensor 14 and the liquid LQ in the container 2. The capacitive sensor 14 may operate continuously; or may operate intermittently, for example each time the actuator 14 is operated or on a predetermined time schedule.

The capacitance signal SIG1 is output to the second processor 29 which is coupled to the system memory 30. The second processor 29 estimates the quantity of the liquid LQ in the container 2 in dependence on the received capacitance signal SIG1. The capacitance signal SIG1 changes in proportion to changes in the quantity of the liquid LQ in the container 2. The second processor 29 cross-references the capacitance signal SIG1 with a look-up table T stored in the system memory 30. A lower signal threshold and an upper signal threshold are predefined. The lower signal threshold corresponds to a lower detectable quantity of liquid LQ in the container 2; and the upper signal threshold corresponds to an upper detectable quantity of liquid LQ in the container 2. In the present embodiment the detected capacitance between the capacitive sensor 14 and the liquid LQ is expressed as a numerical capacitive level count. A value of 50,000 counts corresponds to a liquid level of 100% (i.e., the container 2 is full of said liquid LQ); and a value of 40,000 counts corresponds to a liquid level of 5% (i.e., the container 2 is substantially empty). The upper signal threshold is defined as 50,000 counts and the lower signal threshold is defined as 40,000 counts. A delta (Δ) of 10,000 counts represents the difference between the upper and lower signal thresholds. At least between said upper and lower signal thresholds, the quantity of liquid LQ in the container 2 is proportional to the capacitance signal SIG1 received from the capacitive sensor 14. The operation of the electronic control unit 15 to monitor the quantity of liquid LQ in the container 2 is substantially unchanged from the previous embodiment.

It will be appreciated that various changes and modifications can be made to the dispenser 1 described herein without departing from the scope of the present application. For example, the second processor 29 may apply a mathematical function to the received capacitance signal SIG1 to estimate the quantity of the liquid LQ in the container 2. The mathematical function may comprise a linear function or a polynomial function which defines the relationship between the received capacitance signal SIG1 and the quantity of liquid LQ in the container 2.

The electronic control unit 15 may optionally be calibrated when the full container 2 is installed. The calibration could, for example, be performed automatically when the synchronization button 39 is depressed.

The conductive properties of different types of liquid LQ may vary resulting in variations in the measured capacitance. To compensate for any such variations, the dispenser 1 may be calibrated for a particular type and/or composition of liquid LQ. Alternatively, or in addition, the shape or composition of the container 2 may affect the measured capacitance. The dispenser 1 may be calibrated for a particular shape and/or composition of container 2.

The dispenser 1 could be configured to operate in conjunction with a particular type of container 2 and/or liquid LQ, for example a proprietary container 2. Alternatively, the dispenser 1 may be used with a plurality of different containers 2. The dispenser 1 may be re-calibrated for use with different containers 2. A plurality of different look-up tables T may be predefined for use with different containers 2 and/or liquids LQ. The electronic control unit 15 may comprise means for selecting a particular look-up table T. For example, one or more switch or controller may be provided to configure the electronic control unit 15 for use in different applications.

In an alternate embodiment, the functions of the first and second processors 28, 29 may be performed by a single processor. For example, the functions of the first and second processors 28, 29 may both be performed by a single processor in the sensor control unit 27. In this arrangement, the sensor control unit 27 may estimate the quantity of liquid LQ remaining in the container 2 in dependence on the capacitance signal SIG1. The sensor control unit 27 would output a quantity estimation signal SIG2.

In a further alternative, the capacitance signal SIG1 may be output from the capacitive sensor 14 to the base station 37 to be processed remotely from the dispenser 1. The base station 37 may estimate the quantity of liquid LQ in the container 2 in dependence on the received capacitance signal SIG1. The base station 37 may schedule servicing of the dispenser 1 in dependence on the estimated quantity of liquid LQ. The base station 37 may be coupled to a plurality of like dispensers 1.

The invention has been described herein has been described with reference to a dispenser 1 for dispensing a liquid LQ. It will be understood that the invention is not limited to this particular application. For example, the dispenser 1 could be used to dispense an anti-bacterial solution, a barrier cream or a moisturising cream. Further embodiments which are not related to washroom applications are also contemplated.

What is claimed and desired to be secured by Letters Patent of the United States is:

1. A dispenser, comprising:
   a housing for receiving a removable container containing a liquid;
   an actuator dispensing means for dispensing the liquid from the container;
   a capacitive sensor comprising an electrically conductive a sensing element for positioning proximal to an exterior of the container, the capacitive sensor being operative to measure the capacitance between the electrically conductive element and the liquid in the container, and to generate a capacitance signal providing an indication of the measured capacitance; and
   a processor for receiving a capacitance signal from the capacitive sensor, the processor being configured to estimate a quantity of liquid in the container in proportion to the dependence on said capacitance signal;
   wherein the electrically conductive element is spring biased against the exterior of the container.

2. The dispenser according to claim 1, wherein the processor is configured to estimate the quantity of liquid in the container in proportion to the received capacitance signal above a lower signal threshold and/or below an upper signal threshold.

3. The dispenser according to claim 2, wherein the lower signal threshold corresponds to a predetermined quantity of liquid in the container and/or the upper signal threshold corresponds to a predetermined quantity of liquid in the container.

4. The dispenser according to claim 3, wherein the lower signal threshold is predefined and/or the upper signal threshold is predefined.

5. The dispenser according to claim 3, wherein the lower signal threshold corresponds to a base signal.

6. The dispenser according to claim 1, wherein a plurality of capacitance bands are predefined, each capacitance band corresponding to a predetermined quantity of liquid in the container.

7. The dispenser according to claim 6, wherein the processor is configured to identify one of said predefined capacitance bands in dependence on the received capacitance signal.

8. The dispenser according to claim 1, wherein the electrically conductive element is adapted to be positioned proximate to a lower portion of the container.

9. The dispenser according to claim 8, wherein the electrically conductive element is adapted to be positioned proximate to a bottom wall of the container.

10. The dispenser according to claim 9, wherein the electrically conductive element is adapted to be positioned proximate to an underside of the bottom wall.

11. The dispenser according to claim 1, wherein the processor is configured to output an estimated quantity signal.

12. The dispenser according to claim 11, wherein the processor is coupled to a transmitter for transmitting the estimated quantity signal.

13. The dispenser according to claim 1, wherein the dispenser is configured for dispensing a liquid soap from the container.

14. An apparatus for estimating a quantity of liquid in a container, the apparatus comprising:
    a capacitive sensor comprising an electrically conductive element for positioning proximal to an exterior of the container, the capacitive sensor being operative to measure the capacitance between the electrically conductive element and the liquid in the container, and to generate a capacitance signal providing an indication of the measured capacitance; and
    a processor for receiving a capacitance signal from the capacitive sensor, the processor being configured to estimate a quantity of liquid in the container in proportion to the dependence on said capacitance signal;
    wherein the electrically conductive element is spring biased against the exterior of the container.

15. A method of estimating a quantity of liquid in a container, the method comprising the step(s) of:
    using a capacitive sensor comprising an electrically to generate a capacitance signal, the capacitance signal providing an indication of a measured capacitance between the electrically conductive element and the liquid in the container: and
    estimating a quantity of liquid in the container in dependence on said capacitance signal, wherein the quantity of liquid in the container is estimated in proportion to the received capacitance signal;
    wherein the electrically conductive element is spring biased against the exterior of the container.

16. The method according to claim 15, wherein the quantity of liquid in container is estimated with reference to a plurality of predefined capacitance bands, each capacitance band corresponding to a predetermined quantity of liquid in the container.

17. The method according to claim 16, comprising the step of identifying one of said predefined capacitance bands in dependence on the received capacitance signal.

* * * * *